July 26, 1960 E. J. HUJSAK 2,946,222
SENSITIVE RESISTANCE BRIDGE CIRCUIT
Filed May 4, 1955
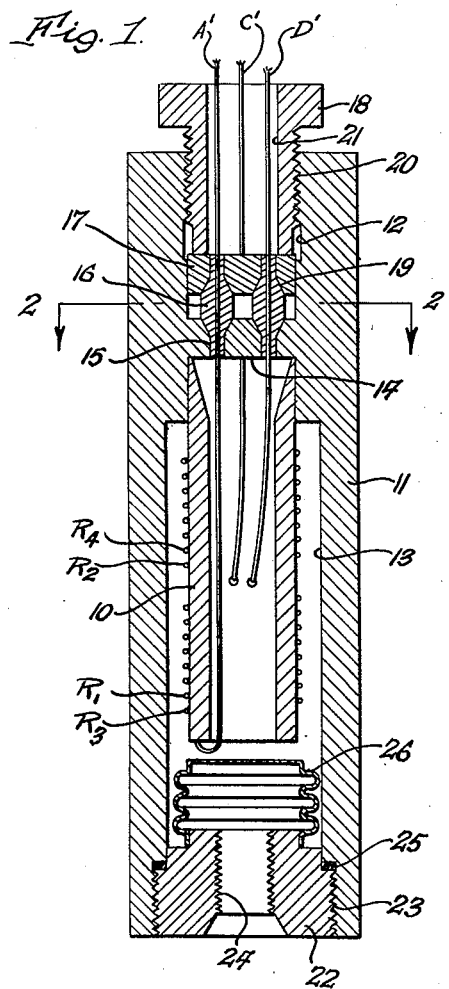
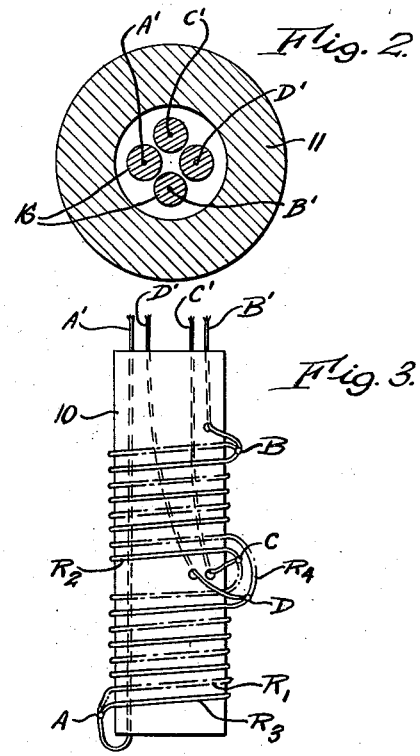
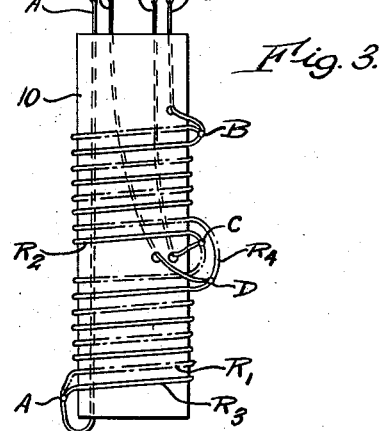
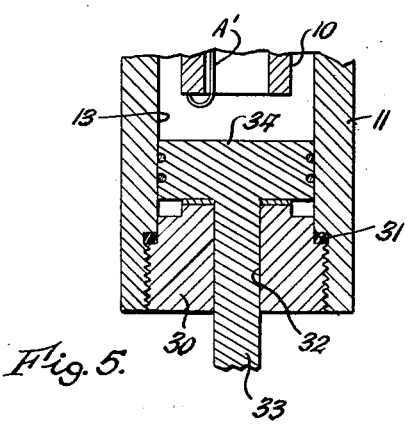
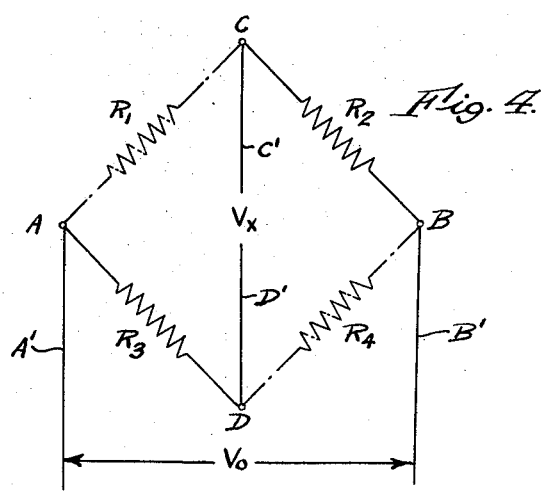
INVENTOR.
Edward J. Hujsak
BY Popp and Sommer
ATTORNEYS.

United States Patent Office 2,946,222
Patented July 26, 1960

2,946,222

FLUID PRESSURE SENSITIVE RESISTANCE BRIDGE CIRCUIT

Edward J. Hujsak, 72 Redmond Ave., Buffalo, N.Y.

Filed May 4, 1955, Ser. No. 505,978

10 Claims. (Cl. 73—398)

This invention relates to the measurement of pressures and pertains more particularly to a transducer for translating fluid pressure in terms of an electrical quantity.

The principal object of the present invention is to provide a device wherein the elements thereof will provide an electrical signal that is proportional to any imposed pressure when a constant voltage is supplied to the device.

Another object is to provide such a device which utilizes the property of pressure coefficient of resistance to a maximum effect, as opposed to the use of strain elements in conventional instruments.

Another object is to provide such a device which will respond rapidly to pressure changes the values of which are desired to be accurately measured.

Another object is to provide such a device which may be used for the measurement of pressures which may vary over a wide range, say, from one atmosphere to five thousand atmospheres.

A further object is to provide such a device which will be insensitive to vibration.

Other objects and advantages of the present invention will be apparent from the following description and accompanying drawings in which:

Fig. 1 is a central longitudinal sectional view through a transducer embodying the preferred form of the present invention.

Fig. 2 is a transverse sectional view thereof, taken on line 2—2, Fig. 1.

Fig. 3 is an elevational view of the coil assembly, partially shown in Fig. 1, and illustrating the connection of the various wire elements in a somewhat schematic manner for ease of understanding.

Fig. 4 is a wiring diagram of the circuit of the transducer shown in the preceding figures.

Fig. 5 is a fragmentary central sectional view of the lower portion of a transducer and showing a modified construction as compared to Fig. 1.

A transducer constructed in accordance with the present invention can perhaps best be understood by referring first to the wiring diagram of its electrical circuit shown in Fig. 4. As there shown, four resistors such as $R_1$, $R_2$, $R_3$ and $R_4$ of equal resistance, are connected to form the four arms of a balanced Wheatstone bridge, having the input terminals A and B, and the output terminals C and D.

The resistors $R_1$, $R_2$, $R_3$ and $R_4$ are the elements by means of which pressures are sensed. The oppositely arranged pair of resistors $R_1$ and $R_4$, shown by dot-dash lines in Fig. 4, are made of any suitable material which possesses a positive pressure coefficient of resistance, that is to say, a material whose electrical resistance increases as the compression of the material increases. The other pair of opposite resistors $R_2$ and $R_3$, shown by solid lines in Fig. 4, are made of any suitable material which possesses a negative pressure coefficient of resistance, that is to say, a material whose electrical resistance decreases as the compression of the material increases. Materials possessing such characteristics are known and commercially available. For example, a material having a positive pressure coefficient of resistance is known to the trade as manganin. A material having a negative pressure coefficient of resistance is known to the trade as Advance, the same being an alloy of 54–55% copper and 44–46% nickel.

Pressure coefficient of resistance may be defined as:

$$K = \frac{1}{P} \frac{\Delta R}{R_o}$$

where:

$K$ = Pressure coefficient of resistance
$P$ = Pressure
$\Delta R$ = Change in resistance
$R_o$ = Original resistance The wiring of the Wheatstone bridge so that one pair of opposite arms $R_1$ and $R_4$ have a positive pressure coefficient of resistance, and the other pair of opposite arms $R_2$ and $R_3$ have a negative pressure coefficient of resistance, has the effect that, for a given voltage input $V_o$, the voltage output $V_x$ will be four times the voltage output of a single arm, at any given pressure. This is so if the materials are such that the pressure coefficients of resistance are equal in value, though opposite in sign. Of course, all arms of the bridge must be subjected to the same pressure.

Referring now to the construction of the transducer shown in the other figures of the drawing, particularly Fig. 3, the resistors $R_1$, $R_2$, $R_3$ and $R_4$ are shown as being wires wound upon a cylindrical tubular core 10 of non-conducting material. These wires are wound on the core in such manner that the windings themselves are non-inductive. Lead wires A', B', C' and D' are shown as being connected at one end to the correspondingly designated terminals and extending in most cases through holes in the core and thence in all cases upwardly thereof and outwardly beyond the upper end thereof. In Fig. 3, the resistors $R_1$ and $R_4$ are represented by dot-dash lines and the resistors $R_2$ and $R_3$ by solid lines, in the same manner as in the diagram, Fig. 4.

Referring to Fig. 1, the upper end of the core 10 is mounted on and within a body 11. This body 11 is shown as being a vertically elongated cylinder and being internally formed with a relatively shallow recess 12 at its upper end and a comparatively deeper recess 13 at its lower end, leaving a transverse wall 14 therebetween. The core 10 with the resistors wound thereon is arranged within the lower recess 13 in spaced relation to the side wall thereof. The upper end of the lower recess 13 is reduced in diameter and the upper end of the core 10 is shown as being press fitted thereinto, bottoming on the lower surface of the transverse wall 14.

The transverse wall 14 is shown as having four vertical holes 15 through which the lead wires A', B', C' and D' severally extend. Each hole 15 has its upper end countersunk so as to receive a seal 16. Each seal is made of a suitable compressible non-conducting material such as soft soapstone or a fluorine plastic. As shown, each seal 16 is in the form of a body having a central vertical hole extending completely through it and an external form including an enlarged central cylindrical section, cylindrical end sections of smaller diameter and a frusto-conical intermediate section between the central section and each of the end sections.

Each of the lead wires is sealed in passing through the transverse wall 14 by such a seal 16 seated in each of the holes 15 in the transverse wall and held there by a gland 17 and follower nut 18. The gland 17 is shown as being in the form of a disk transversely and slidably arranged in the lower portion of the upper recess 12 and having four holes 19, each in registry with the companion hole 15 in the transverse wall 14. The lower end of each hole 19 is countersunk so as to seat on the upper frusto-conical section of the corresponding seal 16.

The follower nut 18 has a threaded engagement with the body 11 as indicated at 20, has a central vertical passage 21 through which the lead wires extend, and bears at its inner end against the upper surface of the gland 17.

It will be seen that by tightening down the follower nut 18 the gland 17 will be forced toward the transverse wall 14 thereby compressing the seals 16 therebetween. This results in the compression of the seals 16 against their seats and about their respective lead wires and provides an effective sealing of these wires at their exit from the lower recess 13 in the body 11.

While the resistors $R_1$, $R_2$, $R_3$ and $R_4$ may be subjected directly to a fluid whose pressure is to be measured or indicated, it is desirable to submerge the resistors in a body of any suitable liquid which does not have a deleterious effect on the resistors or their functioning, such as a di-electric oil, in order to permit the transducer to be used for measuring pressures in any medium, whether corrosive or not.

The recess 13 provides a chamber in which the di-electric oil may be confined. By subjecting this body of confined oil to the pressure of the fluid whose pressure is to be measured, the oil is subjected to the same pressure which in turn applies itself to the resistors $R_1$, $R_2$, $R_3$ and $R_4$.

The transmission of fluid pressure to be measured to the di-electric oil confined in the recess 13 may be variously accomplished. As shown in Fig. 1, the lower end of the recess 13 is closed by an end fitting 22 having an externally threaded engagement with the body 11 as indicated at 23, and having an internally threaded central vertical hole 24 intended to be connected by a line or tube (not shown) leading from the chamber or vessel containing fluid whose pressure is to be measured. A seal or gasket 25 is shown as interposed between the fitting 22 and body 11 and this seal may be of any well known construction such as a rubber O-ring. The fitting 22 is shown as being formed with an upstanding neck of reduced diameter around which is fitted and suitably sealed thereto the mouth of a bellows 26. Instead of connecting a line to the hole 24, this hole can serve as a port to admit the fluid to be measured directly to the interior of the bellows 26, if the transducer is suitably mounted for this arrangement. It is by means of the port or passage 24 in the end fitting 22 that the pressure is sensed. The movement of the bellows when pressure is applied is a function of the compressibility of the di-electric oil. A large enough spacing is provided between the bellows 26 and the lower end of the core 10 so that the same transducer may be used for high pressure measurement as well as low pressure measurement. By low pressures is meant pressures above 15 pounds per square inch gauge.

Fig. 5 shows a modified construction for transmitting a force, not necessarily derived from a fluid pressure, to the di-electric oil confined within the recess 13 in order to pressurize it. In this case, the lower end of the body 11 is shown as being closed by an externally threaded plug 30 screwed into the body with a gasket or seal 31 interposed therebetween, and having a central vertical bore 32. Slidably arranged within this bore 32 is a piston rod 33 having a piston head 34 at its upper or inner end. The piston head 34 works on the inner cylindrical wall of the recess 13 and is suitably sealed for axial movement therealong so as to confine the di-electric oil in this recess. With this construction, the transducer becomes a thrust gauge for use in measuring, say, the thrust of rocket engines, or if the device is inverted the piston rod can be used to support an object whose weight is to be measured.

As previously described, an input voltage can be applied to the terminals A and B through the lead wires A' and B'. The output voltage at the terminals C and D can be measured by connecting the lead wires C' and D' to any suitable type of recording potentiometer (not shown). Since the response of the transducer is linear, it is necessary to calibrate the device only at low pressures. Extrapolation of the calibration curve to high pressures will suffice to give accuracy of the same order of magnitude as at low pressures.

Since the output voltage ($V_x$) of the transducer is small, i.e., in the order of 1.5 microvolts per pound per square inch pressure change at a 10 volt input ($V_o$), it will probably be necessary in most cases to make use of suitable means (not shown) to amplify such voltage output. Such amplification means are well known to those skilled in the art and form no part of the present invention and hence have not been illustrated.

In use of the illustrated transducer, force is applied to the confined body of di-electric oil within the recess 13 tending to compress it and thereby increasing its pressure in proportion to the amount of force applied. This pressure of the oil is in turn applied to all surfaces of the resistors $R_1$, $R_2$, $R_3$ and $R_4$ thereby placing them in a state of compression and because of their pressure coefficients of resistance, as previously described, the resistors will vary their values of resistance so as to unbalance the Wheatstone bridge and thereby produce an output voltage $V_x$ which is proportional to the pressure and hence this output voltage can be employed to measure or indicate its value.

It is to be noted that, except for the bellows 26 in Fig. 1 or the piston 34 in Fig. 5, the present transducer has no moving parts and hence it has an extremely fast response and is operative over a wide range of pressures. No hysteresis has been detected in the calibration curve of a stabilized transducer, i.e., one in which the resistors have received the proper heat treatment and seasoning.

I claim:

1. A transducer for translating fluid pressure in terms of an electrical quantity, comprising four resistors each composed of a material having an electrical resistance which varies in response to fluid pressure applied directly thereto, said resistors being arranged in the form of a Wheatstone bridge having input and output terminals and being further arranged to be exposed directly to a fluid whose pressure is to be measured so as to be stressed solely by the pressure of said fluid, two of said resistors forming a pair of opposite arms of said bridge having a positive pressure coefficient of resistance and the other two of said resistors forming the other pair of opposite arms of said bridge having a negative pressure coefficient of resistance, whereby when a given voltage is imposed across said input terminals and the pressure of said fluid varies, any change in voltage across said output terminals is due solely to the change in resistance of said resistors caused by the direct application thereto of fluid pressure.

2. A transducer, comprising a body having a chamber, a body of di-electric liquid filling and confined within said chamber, four resistors each composed of a material having an electrical resistance which varies in response to liquid pressure applied directly thereto, said resistors being submerged in said liquid and arranged in the form of a Wheatstone bridge having input and output terminals and being further arranged to be stressed solely by the pressure of said liquid, two of said resistors forming a pair of opposite arms of said bridge having a positive pressure coefficient of resistance and the other two of said resistors forming the other pair of opposite arms of said bridge having a negative pressure coefficient of resistance, and means arranged to pressurize said liquid in response to a force whose value is to be indicated, whereby when a given voltage is imposed across said input terminals and the pressure of said liquid varies, any change in voltage across said output terminals is due solely to the change in resistance of said resistors caused by the direct application thereto of liquid pressure.

3. A transducer, comprising a body having a recess, a closure for said recess and providing jointly therewith a chamber, said closure being movable relative to said body so as to vary the size of said chamber and by a force whose value is to be indicated, a body of di-electric liquid filling said chamber and confined therein, and four resistors each composed of a material having an electrical resistance which varies in response to liquid pressure applied directly thereto, said resistors being submerged in said liquid and arranged in the form of a Wheatstone bridge having input and output terminals and being further arranged to be stressed solely by the pressure of said liquid, two of said resistors being one pair of opposite arms of said bridge having a positive pressure coefficient of resistance and the other two of said resistors being the other pair of opposite arms of said bridge having a negative pressure coefficient of resistance, whereby when a given voltage is imposed across said input terminals and the pressure of said liquid varies, any change in voltage across said output terminals is due solely to the change in resistance of said resistors caused by the direct application thereto of liquid pressure.

4. A transducer as set forth in claim 3 in which said movable closure is a bellows device.

5. A transducer as set forth in claim 3 in which said movable closure is a piston device.

6. A transducer for translating fluid pressure in terms of an electrical quantity, comprising a body having a recess, a support arranged within said recess and mounted on said body, four wire resistors each composed of a material having an electrical resistance which varies in response to fluid pressure applied directly thereto, said resistors being arranged on said support and interconnected in such manner as to form a Wheatstone bridge having input and output terminals and being further arranged to be exposed directly to a fluid whose pressure is to be measured so as to be stressed solely by the pressure of said fluid, two of said resistors being one pair of opposite arms of said bridge having a positive pressure coefficient of resistance and the other two of said resistors being the other pair of opposite arms of said bridge having a negative pressure coefficient of resistance, input lead wires connected to said input terminals, and output lead wires connected to said output terminals, said lead wires extending externally of said recess, whereby when a given voltage is imposed across said input terminals and the pressure of said fluid varies, any change in voltage across said output terminals is due solely to the change in resistance of said resistors caused by the direct application thereto of fluid pressure.

7. A transducer as set forth in claim 6 in which said support is externally round and said wire resistors are non-inductively wound thereon.

8. A transducer for translating fluid pressure in terms of an electrical quantity, comprising a body having a recess with a wall at one end thereof, a tubular support arranged within said recess and mounted on said body, four wire resistors each composed of a material having an electrical resistance which varies in response to fluid pressure applied directly thereto, said resistors being non-inductively wound on the exterior of said support and interconnected in such manner as to form a Wheatstone bridge having input and output terminals and being further arranged to be exposed directly to a fluid whose pressure is to be measured so as to be stressed solely by the pressure of said fluid, two of said resistors being one pair of opposite arms of said bridge having a positive pressure coefficient of resistance and the other two of said resistors being the other pair of opposite arms of said bridge and having a negative pressure of coefficient of resistance, input lead wires connected to said input terminals, output lead wires connected to said output terminals, said lead wires being housed within the interior of said support and extending exteriorly of said recess and through said wall, and means for sealing the passage of said lead wires through said wall, whereby when a given voltage is imposed across said input terminals and the pressure of said fluid varies, any change in voltage across said output terminals is due solely to the change in resistance of said resistors caused by the direct application thereto of fluid pressure.

9. A transducer for translating fluid pressure in terms of an electrical quantity, comprising a body having a wall separating two recesses on opposite sides thereof, said wall having four holes therethrough, a tubular support arranged within one of said recesses adjacent said wall and having its interior in communication with said holes, four wire resistors each composed of a material having an electrical resistance which varies in response to fluid pressure applied directly thereto, said resistors being non-inductively wound on the exterior of said support and interconnected in such manner as to form a Wheatstone bridge having input and output terminals and being further arranged to be exposed directly to a fluid whose pressure is to be measured so as to be stressed solely by the pressure of said fluid, two of said resistors being one pair of opposite arms of said bridge having a positive pressure coefficient of resistance and the other two of said resistors being the other pair of opposite arms of said bridge and having a negative pressure coefficient of resistance, input lead wires connected to said input terminals, output lead wires connected to said output terminals, said lead wires being housed within the interior of said support and extending through said wall, and means for sealing the passage of said lead wires through said wall and including a gland arranged within the other of said recesses and having four holes in registry with the first mentioned holes in said wall, a seal of compressible material surrounding each of said lead wires and arranged in the corresponding set of holes in said wall and gland and a follower arranged on said body to move said gland toward said wall and compress said seals, whereby when a given voltage is imposed across said input terminals and the pressure of said fluid varies, any change in voltage across said output terminals is due solely to the change in resistance of said resistors caused by the direct application thereto of fluid pressure.

10. A transducer as set forth in claim 9 in which the opposing ends of the holes in said gland and wall are countersunk and each of said seals has a frusto-conical portion seated on the countersunk portions of the corresponding set of said holes.

References Cited in the file of this patent

UNITED STATES PATENTS

| | | |
|---|---|---|
| 2,175,890 | Glowatzki | Oct. 10, 1939 |
| 2,230,779 | Johnson | Feb. 4, 1941 |
| 2,566,326 | Guillemin | Sept. 4, 1951 |
| 2,573,286 | Statham et al. | Oct. 30, 1951 |
| 2,580,407 | Clark | Jan. 1, 1952 |
| 2,807,167 | Statham | Sept. 24, 1957 |

FOREIGN PATENTS

| | | |
|---|---|---|
| 895,637 | France | Apr. 11, 1944 |

OTHER REFERENCES

ASME-Transactions, vol. 75, April 1953, pp. 311, 312 and 313.